United States Patent [19]

Papson et al.

[11] Patent Number: 4,575,663

[45] Date of Patent: Mar. 11, 1986

[54] MICROPROCESSOR BASED TWO SPEED MOTOR CONTROL INTERFACE

[75] Inventors: Gregory J. Papson, Eastlake; Adolph L. Trolli, Mentor, both of Ohio

[73] Assignee: The Babcock & Wilcox Company, New Orleans, La.

[21] Appl. No.: 648,100

[22] Filed: Sep. 7, 1984

[51] Int. Cl.[4] ............................................. H02P 5/00
[52] U.S. Cl. .................................. 318/305; 318/326; 318/327; 318/445; 318/446
[58] Field of Search ............... 318/305, 307, 308, 310, 318/314, 318, 326, 327, 328, 445, 446, 789, 799, 741, 742

[56] References Cited

U.S. PATENT DOCUMENTS

| | | | |
|---|---|---|---|
| 3,422,330 | 1/1969 | Swanke | 318/305 |
| 3,843,914 | 10/1974 | Carlson et al. | 318/327 |
| 3,853,174 | 12/1974 | Kramer | 318/305 X |
| 4,009,825 | 3/1977 | Coon | 318/305 X |
| 4,066,937 | 1/1978 | Pfarrer et al. | 318/789 X |
| 4,085,594 | 4/1978 | Mayer | 318/306 X |
| 4,207,031 | 6/1980 | Maskrey et al. | 318/306 X |
| 4,211,967 | 7/1980 | Akiyama et al. | 318/318 X |
| 4,374,353 | 2/1983 | Habisohn | 318/305 X |

Primary Examiner—William M. Shoop, Jr.
Assistant Examiner—Shik Luen Paul Ip
Attorney, Agent, or Firm—Vytas R. Matas; Robert J. Edwards

[57] ABSTRACT

A two speed motor control comprises push buttons that can be activated to start, stop, select a high start of speed or select a low start of speed for the motor. The high and low selector buttons can be used to transfer between high and low speed operation for the motor. Units in the form of AND gates for example can be provided with inputs to establish permissive conditions for a motor start up or speed change operation. These automatically avoid overheating the motor or starting the motor during an inappropriate condition of equipment connected to the motor. Start up and speed selection is achieved without the operator having to verify the existance of appropriate conditions.

6 Claims, 2 Drawing Figures

MICROPROCESSOR BASED TWO SPEED MOTOR CONTROL INTERFACE

FIELD AND BACKGROUND OF THE INVENTION

The present invention relates in general to the control of two speed motors, which can be used in fans for moving air or gas through an industrial plant, and in particular, to a new and useful motor control arrangement which permits the manual or automatic startup of a motor from an at rest position to a low or high speed condition and the automatic or manual transfer between the high and low positions.

Industrial boilers having large output capacities generally require the use of fans for moving air or other gases through the boiler and out the stack of the boiler.

Forced draft (FD) fans are utilized to force air at above atmospheric pressure into the combustion chamber of a boiler. Such FD fans must have a discharge pressure which is high enough to equal the total resistance in air ducts, air heaters, burners and fuel beds as well as other resistance between the fan discharge and the furnace. The furnace is generally the point of balanced draft, that is the point at which the pressure in the furnace equal atmospheric pressure. The volume output of the forced draft fan must equal the total quantity of the air required for combustion plus air heater leakage.

Induction draft (ID) fans are utilized on the stack side of the boiler for discharging combustion products and other gases into the stack. The ID fans operate to establish a pressure below atmostpheric pressure at the inlet end of the fan to draw off the gases and also to establish the balanced draft.

Before an ID fan can be started up or have its speed changed, care must be taken that certain conditions exist in the boiler. This includes the correct setting of any control mechanisms such as dampers which are associated with the FD fan as well as outlet dampers for the ID fan, the correct setting of secondary air dampers for the burners in the boiler and the setting of dampers in a baghouse of the boiler. It is also desirable to control the ID fan both manually and automatically.

The speed control of large motors such as those used for induction and force draft fans as well as those used for pumps or other large equipment, has hitherto required large mechanical speed changers such as the ESCO oil filed speed changer switch for two seed motors. This speed changer switch was manually operated and had electromechanical trip circuits.

SUMMARY OF THE INVENTION

The present invention is drawn to a control arrangement for a two speed motor, e.g. the motor of an ID (induction draft) fan for a boiler or other industrial plant. Other two speed motors can also be controlled according to the invention, however.

According to the invention, the motor can be started up and set at a high speed or a low speed. The speed of the motor can also manually be controlled to shift it from high to low speed or from low to high speed while still observing other proper conditions to maintain a safe condition.

According to the invention, a speed transfer can also be made automatically depending on flow conditions and demand which is being placed on a fan which is driven by the motor.

A further object of the invention is to provide a motor control which can be implemented using available NETWORK 90 instrumentation. NETWORK 90 is a registered trademark of the Bailey Controls Company or Babcock and Wilcox, a McDermott Company.

A still further object of the invention is to provide a motor control arrangement which is simple in design, rugged in construction and economical to manufacture.

The invention is a totally automated microprocessor based interlocked system which provides fully automatic and manual control capacities. When an operator selects the automatic mode this allows for automatic speed changes based on load after a motor to be controlled has been started. Interlocks are built in to inhibit speed changes within 30 minutes of operation at one speed to prevent motor over heating. The invention requires the operator only to select the speed desired. The operator is not required to look at speed indicators or breaker positions for safely changing speed. The invention automatically accounts for motor coast down when a high to low speed transfer is requested. Also, an on-line indication of speed changes in progress is provided (low or high). The invention also gives indication of high or low speed based on the fact that a speed change has been requested and the motor is at the proper RPM.

Accordingly an object of the invention is to provide a two speed motor control for a motor having a high speed start breaker which is closable to start the motor at high speed, a low speed start breaker which closable to start the motor at low speed and a stop breaker which opens to stop the motor, comprising, a start switch, preferably in the form of a push button, which is manually operable to start the motor at high or low speed, pending the satisfaction of certain conditions. The invention includes motor start permissive means, which can be in the form of a logic circuit using AND and OR gates for example which is connected to the start switch for receiving a start signal therefrom. A plurality of additional inputs is connected to the permissive means for carrying permissive signals which are indicative of various conditions of the system to which the motor is connected, which are appropriate for the motor to start. In the environment of a boiler for example if the motor to be controlled is the motor connected to the induction draft fan, sensors in the boiler which determine whether certain baffles are open or closed must be provided and their signals must indicate the appropriate position for the baffles.

The invention includes high selector means as well as low selector means both of which having a manually operable switch or push button for an operator to select whether the motor is to be started in its high speed or in its low speed. The high and low selector means are connected between the motor start permissive means and a high speed start permissive means and a low speed start permissive means respectively. The high speed start permissive means, will apply a signal to the high speed start breaker to close that breaker and start the motor at high speed only if certain other conditions are satisfied. Similarly the low speed start permissive means will close the low speed start breaker only if certain conditions are satisfied.

The invention also utilizes a stop switch or push button which can be activated to stop the motor at any selected time. An abort to off means is also connected to the stop breaker for stopping the motor on the occurence of an emergency condition in the system or more specifically on failure of the two speed motor control to effect a low speed transfer. Abort to low speed means are connected to the low speed start breaker for activating the low speed start breaker if a high speed transfer failure is experienced in the two speed motor control. Abort to high speed means are connected to the high speed breaker for activating the high speed breaker if there is a failure in transfer from a high to a low condition.

A further object of the invention is to provide a microprocessor which includes a program for determining the permissives. The permissive means may be embodied using logic blocks of a NETWORK 90 microprocessor system. NETWORK 90 is a trademark of Babcock and Wilcox, a McDermott Company.

A further object of the invention is to provide a two speed motor control which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiment of the invention is illustrated.

DESCRIPTION OF THE PREFERRED EMBODIMENT

Figure 1:
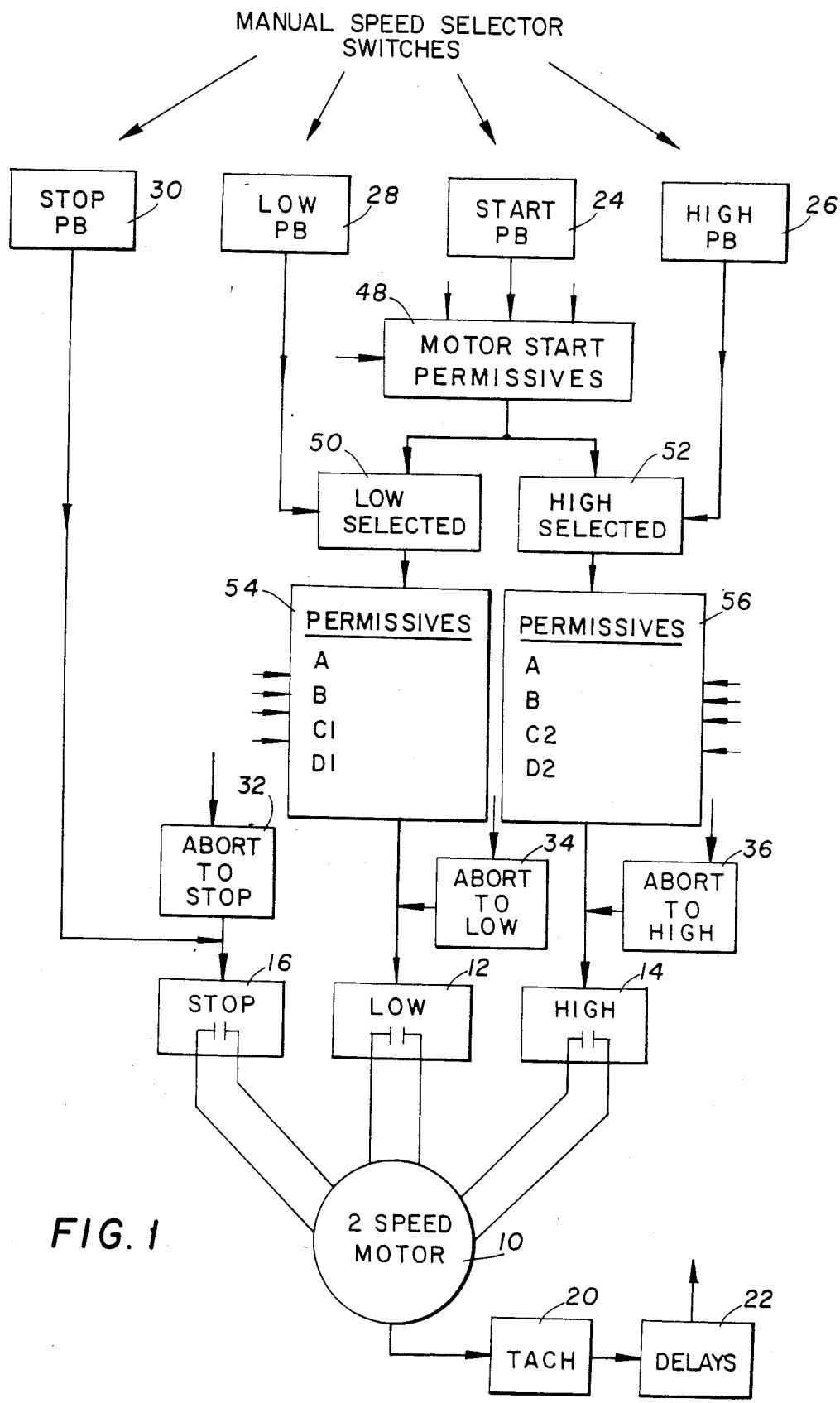
FIG. 1 is a block diagram showing the elements of the invention and in particular the sequence of logical steps required to start a two speed motor in its high or low speed state, or to stop the two speed motor.

Referring to FIG. 1, the invention comprises a two speed motor control for a two speed motor 10 that is capable of being started at low speed using a low speed breaker 12 and at high speed using a high speed breaker 14. Motor 10 also includes a stop breaker 16 which opens to stop the motor 10. Two speed motor 10 as well as breakers 12,14 and 16 are well known in the art so that additional details will not be provided here.

Motor 10 is provided with a tachometer 20 which determines its rotational speed. Tachometer 20 provides an output signal which is supplied to delay circuits 22 for determining whether a selected rotation of speed has been maintained for a certain duration.

The control of the invention includes switches which are preferably in the form of push buttons for starting and stopping the motor as well as for selecting whether the motor will be started at high or low speed. Push button 24 can be activated for starting the motor, pending the satisfaction of certain conditions. Push button 26 can be pressed to select a high speed start or to transfer operation of the motor from a low speed to a high speed condition. Push button 28 can be activated to select a low speed start and also to switch the motors operation from high to low speed operation. Push botton 30 can be activated to stop the motor by directly activating stop breaker 16. Also connected to stop breaker 16 is an abort-to-stop element 32 which can receive an input from various sources to automatically stop the motor on the occurence of appropriate conditions.

Connected to the low speed start breaker 12 is an abort-to-low speed element 34 which has an input connected to sensing circuits which determine if a desired transfer or start to high speed operation has failed. Upon sensing this failure abort-to-low unit 34 activates low speed breaker 12 and causes the motor to switch or continue operation at low speed. An abort-to-high speed unit 36 activates high speed breaker 14 upon the occurence of a transfer failure in tranferring from high to low speed operation. The abort-to-high unit 36 is provided with input for determining the occurence of such a transfer failure.

Connected to the start push button 24 is a motor start permissives unit 40 which includes a plurality of additional inputs. Each of these inputs can be connected to parts of a system that include motor 10 for determining the presence of appropriate conditions for starting the motor. If the motor is used as in induction fan motor in a boiler for example one or more inputs of permissives unit 48 can determine the correct position of baffles associated with the fan. The motor will be started for example only if the baffles are in their correct open position and if they are not in their correct open positions permissives unit 48 will generate no output despite the pressing of push button 24.

Permissives unit 48 is connected to a low selector unit 50 as well as a high selector unit 52. Low selector unit 50 is connected to low push button 28 and, once receiving an activating signal from permissives unit 48, will output a start signal to a permissives unit 54. Likewise, a high push button 26 is pressed and if permissives unit 48 outputs a start signal, high selector unit 42 will output a start signal to permissives unit 56.

Permissives units 48, 54 and 56 may include appropriate logic blocks such as AND and OR gates to determine whether an output start signal should be generated or not.

Permissives unit 54 comprises a low speed start permissives unit and will output a start signal to low speed breaker 12 only if four conditions are satified. The first of these conditions labelled A is that the stop push button 30 has not been depressed. This requires an input from the stop push button 30 which is shown only in the vicinity of unit 54. The second requirement labelled B is that there is no activation of the abort-to-stop unit 32. This requires another input to unit 54 which is also shown only in the vicinity of unit 54. The third requirement labelled C1 is that the high speed motor breaker 14 is not closed. This requires an input from breaker 14 to the unit 54. The last condition relies on tachometer 20 and delay circuits 22. This condition labelled D1 need only be met if a high to low speed transfer is being called for, that is with the motor operating at high speed, the low speed push button 28 is depressed. Upon the selection of such a transfer, the motor speed as determined by the tachometer 20 and delay circuits 22 must have been at high speed for at least a selected number of minutes. In the case of an induction fan motor for example the fan should have been operated at the high speed for about 30 minutes. This is to prevent overheating or damage to the motor due to rapid speed changes. The other part of condition D1 is that the motor speed is sensed to decrease to low. This requires an ongoing measurement of the speed even after permissives unit 54 has output a start signal to the low speed breaker 12. If this decrease in speed is not sensed it is taken as a transfer failure and abort-to-high unit 36 is activated to activate high speed breaker 14.

High speed permissives unit 56 operates in an analogous fashion to permissives unit 54.

Conditions A and B are identical to conditions A and B of the permissives unit 54. Condition C2 requires that the low speed motor breaker 12 not be closed. This is determined by an appropriate input to unit 56 from breaker 12.

Conditions D2 requires that when a transfer from low to high speed has been called for, the motor, as determined by tachometer 20 and delay circuits 22, has previously been operated for more than a selected number of minutes at low speed. Again, for an induction fan, 30 minutes is appropriate for this period. For starting at high speed from an "at rest" condition permissives unit 56 must first activate low speed breaker 12 to control motor 10 to its low speed and then, again after the selected number of minutes, activate breaker 14 to bring the motor up to high speed.

A main advantage of the two speed motor control as shown in FIG. 1 is that an operator need only activate buttons corresponding to a desired result and need not concern himself with whether necessary conditions have been met before an actual motor control signal is passed to the motor through an appropriate breaker. The operator can start the motor either at high or low speed and can transfer from one speed to the other. The operator also has control over stopping the motor. Appropriate indicators can be connected to the permissives units and the tachometer for providing a visual indication of the permissive conditions as well as the motor speed.

Figure 2:
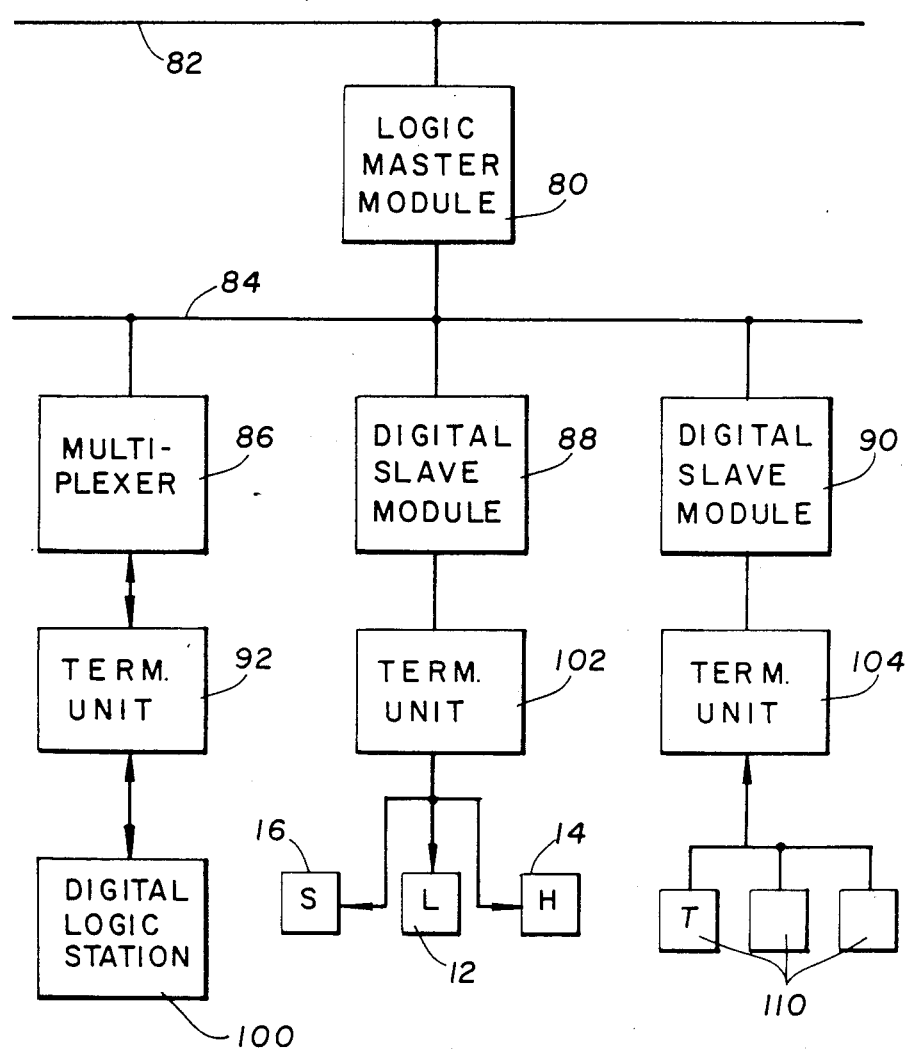
FIG. 2 is a block diagram showing the invention embodied using components of a NETWORK 90 process control unit.

To implement the two speed motor control of the invention, a microprocessor based NETWORK 90 circuit can be assembled to perform the necessary logic and control operations. Such an arrangement is shown in FIG. 2. A master logic module 80 can be programmed to generate start signals upon the occurence of appropriate permissives for units 48, 54 and 56.

Logic master module 80 is connected to module bus 82 for connection to other logic units. It is also connected to an expander bus 84 for connection to multiplexer 86 a first digital slave module 88 and a second digital slave module 90. Multiplexer 86 is connected over a terminal unit 92 to a digital logic station 100. Digital logic station includes the start, stop, low and high selector push buttons and also has light emitting diodes to indicate when each of the buttons has been pressed and what condition has been achieved by pressing the push button. The operators instructions are thus input by station 100 through terminal unit 92 to the multiplexer 86 and the expander bus 84 to the master logic module 80. The master logic module 80 outputs appropriate signals to the first digital slave module 88 which applies control signals over terminal unit 102, in the form for example of a 24 volt line, to the breakers 12, 14 and 16.

Feed back from the motor is established by a terminal unit 104 which is connected to elements shown at 110, such as the breakers and tachometer, and the signals are provided to the second slave module 90. Incorporated in the master module 80 are the delay circuits 22 for determining the appropriate duration for the motor at the appropriate speeds.

While a specific embodiment of the invention has been shown and described in detail to illustrate the application of the principles of the invention, it will be understood that the invention may be embodied otherwise without departing from such principles.

What is claimed is:

1. A two speed motor control for a motor having a high speed breaker closable to operate the motor at high speed, a low speed breaker closable to operate the motor at low speed, and a stop breaker closable to stop the motor, comprising:

a start switch manually operable to start the motor at high or low speed;

motor start permissive means connected to said start switch and having a plurality of inputs for receiving permissive signals indicative of conditions acceptable for the motor to be started, said motor start permissive means having an output for generating a start signal when the start switch is operated and when all of said permissive signals are received;

high speed selector means operable by an operator to select high speed operation for the motor, said high speed selector means being connected to said motor start permissive means output for initiating high speed operation of the motor;

low speed selector means activatable by an operator for initiating low speed operation of the motor, said low speed selector means connected to said motor start permissive means output for initiating low speed operation of the motor;

high speed start permissive means connected to said high speed selector means and having a plurality of inputs for establishing permissive conditions for starting the motor at high speed, said high speed start permissive means connected to the high speed breaker;

low speed start permissive means connected to said low speed selector means and having inputs for establishing permissive conditions for a low speed start of the motor, said low speed start permissive means connected to the low speed breaker;

said high speed selector means includes a high speed selector switch manually operable to select high speed operation, and a low speed switch connected to said low speed selector means manually operable to select low speed operation; and abort means connected to said high and low speed breakers and to said stop breaker for selectively operating said breakers upon the occurence of a start up or transfer failure including an abort-to-low unit connected to the low speed breaker for activating the low speed breaker upon a failure of said high speed start permissive means to activate the high speed breaker, and an abort-to-high speed unit connected to the high speed breaker for activating the high speed breaker upon failure of the low speed start permissive means to activate the low speed breaker.

2. A two speed motor control according to claim 1, wherein said abort means comprises an abort-to-stop unit connected to the stop breaker for activating the stop breaker to stop the motor upon occurence of appropriate conditions.

3. A two speed motor control according to claim 2, including a stop switch connected to the stop breaker for manually activating the stop breaker.

4. A two speed motor control according to claim 3, including a stop switch connected to the stop breaker for manually operating the stop breaker to stop the motor, said high speed selector means including a high speed start switch for selecting high speed operation for the motor, said low speed selector means including a low speed switch for selecting low speed operation for the motor, said high speed start and low speed start permissive means each including a first input for receiving a permissive signal from said stop switch indicating that said stop switch has not been activated, and a second input connected to said abort-to-stop unit for indicating that said abort-to-stop unit has not been activated.

5. A two speed motor control according to claim 4, wherein said high speed start permissive means includes a third input for receiving a permissive signal from the low speed breaker indicating that the low speed breaker is not closed, said low speed start permissive means including a third input for receiving a permissive signal from the high speed breaker indicating the high speed breaker is not closed.

6. A two speed motor control according to claim 5, including delay logic means connected to said motor for determining the speed of the motor and duration for that speed, said high speed start permissive means including a fourth input for receiving a permissive signal from said delay logic means indicating that the motor has operated at low speed for at least a selected number of minutes, said low speed start permissive means including a fourth input for receiving a permissive signal from said delay logic means indicating the motor has operated at high speed for a selected number of minutes.

* * * * *